(12) United States Patent
Morimoto et al.

(10) Patent No.: US 8,903,567 B2
(45) Date of Patent: *Dec. 2, 2014

(54) VEHICLE REMOTE OPERATING SYSTEM AND IN-VEHICLE DEVICE

(71) Applicant: Toyota Jidosha Kabushiki Kaisha, Toyota (JP)

(72) Inventors: Chika Morimoto, Toyota (JP); Kazunori Kagawa, Toyota (JP); Yuka Sobue, Toyota (JP); Satoru Niwa, Toyota (JP); Shin Tanaka, Toyota (JP); Kazuhiro Morimoto, Toyota (JP); Akihisa Yokoyama, Toyota (JP); Junichi Wakita, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/930,621

(22) Filed: Jun. 28, 2013

(65) Prior Publication Data

US 2013/0289801 A1    Oct. 31, 2013

Related U.S. Application Data

(62) Division of application No. 13/504,968, filed as application No. PCT/JP2010/056537 on Apr. 12, 2010.

(51) Int. Cl.
| | |
|---|---|
| *B60W 30/06* | (2006.01) |
| *G08G 1/16* | (2006.01) |
| *B62D 15/02* | (2006.01) |
| *B62D 1/00* | (2006.01) |
| *G06F 17/00* | (2006.01) |

(52) U.S. Cl.
CPC ............... *G06F 17/00* (2013.01); *G08G 1/164* (2013.01); *B62D 15/0285* (2013.01); *B62D 1/00* (2013.01); *B62D 15/027* (2013.01)
USPC ............................. 701/2; 340/932.2; 340/435

(58) Field of Classification Search
CPC . B62D 15/027; B62D 15/0285; B60W 30/06; G08G 1/168; G06K 9/00805; G06K 9/00812; G05D 1/021
USPC ........ 701/2, 23, 25, 36, 41, 70, 408; 340/901, 340/932.2, 988, 435; 348/119, 143, 148
See application file for complete search history.

(56) References Cited

U.S. PATENT DOCUMENTS

2002/0157889 A1* 10/2002 Mackle et al. ................ 180/204
2008/0172147 A1* 7/2008 Taki et al. .......................... 701/2

(Continued)

FOREIGN PATENT DOCUMENTS

| | | |
|---|---|---|
| JP | 2006-44484 | 2/2006 |
| JP | 2006-146811 | 6/2006 |

(Continued)

OTHER PUBLICATIONS

Matsumura et al., JP Pub. No. 2008-009913, Jan. 17, 2008, Toyota Motor Corp. (Machine Translation).*

(Continued)

*Primary Examiner* — Fadey Jabr
*Assistant Examiner* — Courtney Heinle
(74) *Attorney, Agent, or Firm* — Finnegan, Henderson, Farabow, Garrett & Dunner, LLP

(57) ABSTRACT

In a vehicle remote operating system remotely operating a host vehicle VM from a portable terminal 200, a main control unit 112 of an ECU 110 of an in-vehicle device 100 determines an dispatch position of the host vehicle VM on the basis of a parking position of the host vehicle VM and a position of a user U who intends to board the host vehicle VM. Due to this, it becomes possible to dispatch the host vehicle VM according to the parking position of the host vehicle VM and the position of the user U, and convenience is improved in dispatch operation and boarding of the host vehicle VM.

10 Claims, 21 Drawing Sheets

(56) References Cited

U.S. PATENT DOCUMENTS

| | | | |
|---|---|---|---|
| 2009/0206553 A1 | 8/2009 | Kanzaki | |
| 2010/0274414 A1* | 10/2010 | Park | 701/2 |
| 2011/0125344 A1* | 5/2011 | An et al. | 701/2 |
| 2012/0316704 A1* | 12/2012 | Ohbayashi et al. | 701/2 |

FOREIGN PATENT DOCUMENTS

| | | |
|---|---|---|
| JP | 2007-9938 | 1/2007 |
| JP | 2007-272835 | 10/2007 |
| JP | 2007-320433 | 12/2007 |
| JP | 2008-9913 | 1/2008 |
| JP | 2008-15839 | 1/2008 |
| JP | 2008-536734 | 9/2008 |
| JP | 2010-969 | 1/2010 |
| WO | WO 2007/122704 | 11/2007 |

OTHER PUBLICATIONS

Mori et al., JP Pub. No. 2010-000969, Jan. 7, 2010, Aisin AW Co. Ltd. (Macnhine Translation).*
International Search Report in International Application No. PCT/JP2010/056537; Mailing Date: May 18, 2010.
English machine translation of JP 2008-9913 dated Jan. 17, 2008.
English machine translation of JP 2010-969 dated Jan. 7, 2010.
U.S. Office Action for U.S. Appl. No. 13/504,968 mailed Feb. 20, 2014.
Advisory Action for U.S. Appl. No. 13/504,968 mailed Apr. 18, 2014.
Notice of Allowance issued in U.S. Appl. No. 13/504,968 on Jun. 19, 2014.

* cited by examiner

US 8,903,567 B2

VEHICLE REMOTE OPERATING SYSTEM AND IN-VEHICLE DEVICE

This is a division of U.S. application Ser. No. 13/504,968, which is a national stage of International Application No. PCT/2010/056537, filed Apr. 12, 2010. The contents of each of these applications are incorporated herein by reference.

TECHNICAL FIELD

The present invention relates to a vehicle remote operating system and an in-vehicle device, and more particularly to a vehicle remote operating system and an in-vehicle device, which can remotely operate a vehicle from a communication terminal.

BACKGROUND ART

A technique of supporting an operation during parking of a vehicle has been proposed. For example, a parking guidance device that detects an available space of a parking space based on an image captured by a front camera when a vehicle enters the parking space is disclosed in Patent Literature 1. The parking guidance device in Patent Literature 1 predicts dispatch routes in the case where it is assumed that parking of a vehicle has been performed by forward parking and rearward parking with respect to a detected available space. The parking guidance device in Patent Literature 1 compares the degrees of difficulty related to vehicle operations of the predicted dispatch routes, and guides according to a parking method that is determined to be easier.

CITATION LIST

Patent Literature

Patent Literature 1: Japanese Unexamined Patent Application Publication No. 2007-320433

SUMMARY OF INVENTION

Technical Problem

Since it is difficult to open a door wide in a state in which a vehicle is parked in a narrow parking place, a situation is considered, in which ingress and egress on people who intends to board the vehicle is difficult. Further, when it is raining or there is a heavy load, a situation is considered, in which a person who intends to board does not wish to move up to a parking place. In such situations, it is preferable to dispatch the vehicle from the parking place to an appropriate position.

Even in the above-described technique, a parking method having a low degree of difficulty related to the vehicle operation of the dispatch route has been guided, but a person must determine the appropriate dispatch position themself. Due to this, it is preferable to further reduce the burden on people during the dispatch.

In consideration of the above-described circumstances, the object to be achieved by the present invention is to provide a vehicle remote operating system and an in-vehicle device, which can further reduce the burden on people during the dispatch.

Solution to Problem

The present invention relates to a vehicle remote operating system that remotely operates a vehicle from a communication terminal, and relates to a vehicle remote operating system which includes an dispatch position determination unit that determines an dispatch position of the vehicle on the basis of a parking position of the vehicle and a position of a passenger who intends to board the vehicle.

According to this configuration, in the vehicle remote operating system that remotely operates the vehicle from the communication terminal, the dispatch position determination unit determines the dispatch position of the vehicle on the basis of the parking position of the vehicle and the position of the passenger who intends to board the vehicle. Due to this, it is possible to dispatch the vehicle according to the parking position of the vehicle and the position of the passenger, and thus the convenience is improved in the dispatch operation and the vehicle boarding.

In this case, the dispatch position determination unit may determine the dispatch position of the vehicle on the basis of an obstacle that is present in the surroundings of the passenger.

According to this configuration, the dispatch position determination unit determines the dispatch position of the vehicle on the basis of the obstacle that is present in the surroundings of the passenger. Due to this, it is possible to dispatch the vehicle according to the obstacle that is present in the surroundings of the passenger in addition to the parking position of the vehicle and the position of the passenger, and thus the convenience is improved in the dispatch operation and the vehicle boarding.

Further, the dispatch position determination unit may determine the dispatch position of the vehicle on the basis of a width of a road in the surroundings of the passenger.

According to this configuration, the dispatch position determination unit determines the dispatch position of the vehicle on the basis of the width of the road in the surroundings of the passenger. Due to this, it is possible to dispatch the vehicle according to the width of the road in the surroundings of the passenger in addition to the parking position of the vehicle and the position of the passenger, and thus the convenience is improved in the dispatch operation and the vehicle boarding.

Further, the dispatch position determination unit may determine a position in which the vehicle stops with a driver's seat of the vehicle facing toward the passenger as the dispatch position when a distance between the obstacle that is present in the surroundings of the passenger and the passenger is larger than the width of the vehicle and the vehicle is movable to the position in which the vehicle stops with a driver's seat of the vehicle facing toward the passenger without switching between forward and reverse of the vehicle from the parking position.

According to this configuration, the dispatch position determination unit determines the position in which the vehicle stops with a driver's seat of the vehicle facing toward the passenger as the dispatch position when the distance between the obstacle that is present in the surroundings of the passenger and the passenger is larger than the width of the vehicle and the vehicle can move to the position in which the vehicle stops with a driver's seat of the vehicle facing toward the passenger without switching between forward and reverse of the vehicle from the parking position. Due to this, if circumstances permit, it is possible to dispatch the vehicle to the position in which the vehicle stops with a driver's seat of the vehicle facing toward the passenger, and thus the convenience is improved in the vehicle boarding.

Further, the dispatch position determination unit may determine any one of a position in which the vehicle stops with any one seat except for a driver's seat of the vehicle facing toward the passenger and a position in which the vehicle stops with a front end of the vehicle facing toward the passenger as the dispatch position when a distance between the obstacle that is present in the surroundings of the passenger and the passenger is equal to or smaller than the width of the vehicle and the vehicle is unable to move to the position in which the vehicle stops with a driver's seat of the vehicle facing toward the passenger without switching between forward and reverse of the vehicle from the parking position.

According to this configuration, the dispatch position determination unit determines any one of a position in which the vehicle stops with any one seat except for a driver's seat of the vehicle facing toward the passenger and a position in which the vehicle stops with a front end of the vehicle facing toward the passenger as the dispatch position when a distance between the obstacle that is present in the surroundings of the passenger and the passenger is equal to or smaller than the width of the vehicle and the vehicle is unable to move to the position in which the vehicle stops with a driver's seat of the vehicle facing toward the passenger without switching between forward and reverse of the vehicle from the parking position. Due to this, even in the circumstances in which it is not possible to dispatch the vehicle to a position in which the vehicle stops with a driver's seat of the vehicle facing toward the passenger, it is possible to dispatch the vehicle to the position in which the passenger can easily board the vehicle, and thus the convenience is further improved in the vehicle boarding.

Further, the dispatch position determination unit may determine the dispatch position of the vehicle on the basis of traffic of a road in the surroundings of the passenger.

According to this configuration, the dispatch position determination unit determines the dispatch position of the vehicle on the basis of the traffic of the road in the surroundings of the passenger. Due to this, it is possible to dispatch the vehicle according to the traffic of the road in the surroundings of the passenger, in addition to the parking position of the vehicle and the position of the passenger, and thus harmony with the surrounding road traffic can be achieved.

In this case, the dispatch position determination unit may determine a position in which another vehicle can pass along the road in the surroundings of the passenger as the dispatch position if the traffic of the road in the surroundings of the passenger is equal to or greater than a specified threshold value.

According to this configuration, the dispatch position determination unit determines the position in which another vehicle can pass along the road in the surroundings of the passenger as the dispatch position if the traffic of the road in the surroundings of the passenger is equal to or larger than the specified threshold value. Due to this, it is possible to dispatch the vehicle to the position in which passing of another vehicle is not disturbed even when the traffic of the road in the surroundings of the passenger is heavy, and thus harmony with the surrounding road traffic can be achieved.

Further, it may be additionally provided with an automatic dispatch unit that moves the vehicle up to the dispatch position of the vehicle that is determined by the dispatch position determination unit, independently of an operation to the communication terminal, after the vehicle starts from the parking position of the vehicle.

According to this configuration, the automatic dispatch unit moves the vehicle up to the dispatch position of the vehicle that is determined by the dispatch position determination unit, independently of the operation to the communication terminal, after the vehicle starts from the parking position of the vehicle. Due to this, the operation to the communication terminal becomes unnecessary during movement of the vehicle, and the dispatch operation becomes easier.

Further, it may be additionally provided with a temporary stop unit temporarily stopping the moving vehicle by a remote operation from the communication terminal.

According to this configuration, for safety, it becomes possible to temporarily stop parking support or the movement of the vehicle by the remote operation from the communication terminal.

On the other hand, the present invention relates to an in-vehicle device mounted on a vehicle in a vehicle remote operating system that remotely operates the vehicle from a communication terminal, which includes an dispatch position determination unit that determines an dispatch position of the vehicle on the basis of a parking position of the vehicle and a position of a passenger who intends to board the vehicle.

In this case, the dispatch position determination unit may determine the dispatch position of the vehicle on the basis of an obstacle that is present in the surroundings of the passenger.

Further, the dispatch position determination unit may determine the dispatch position of the vehicle on the basis of a width of a road in the surroundings of the passenger.

Further, the dispatch position determination unit may determine a position in which the vehicle stops with a driver's seat of the vehicle facing toward the passenger as the dispatch position when a distance between the obstacle that is present in the surroundings of the passenger and the passenger is larger than the width of the vehicle and the vehicle is movable to the position in which the vehicle stops with a driver's seat of the vehicle facing toward the passenger without switching between forward and reverse of the vehicle from the parking position.

Further, the dispatch position determination unit may determine any one of a position in which the vehicle stops with any one seat except for a driver's seat of the vehicle facing toward the passenger and a position in which the vehicle stops with a front end of the vehicle facing toward the passenger as the dispatch position when a distance between the obstacle that is present in the surroundings of the passenger and the passenger is equal to or smaller than the width of the vehicle and the vehicle is unable to move to the position in which the vehicle stops with a driver's seat of the vehicle facing toward the passenger without switching between forward and reverse of the vehicle from the parking position.

Further, the dispatch position determination unit can determine the dispatch position of the vehicle on the basis of traffic of a road in the surroundings of the passenger.

In this case, the dispatch position determination unit may determine a position in which another vehicle can pass along the road in the surroundings of the passenger as the dispatch position if the traffic of the road in the surroundings of the passenger is equal to or greater than a specified threshold value.

Further, it may be additionally provided with an automatic dispatch unit that moves the vehicle up to the dispatch position of the vehicle that is determined by the dispatch position determination unit, independently of an operation to the communication terminal, after the vehicle starts from the parking position of the vehicle.

Further, it may be additionally provided with a temporary stop unit temporarily stopping the moving vehicle by a remote operation from the communication terminal.

Advantageous Effects of Invention

According to the vehicle remote operating system and the in-vehicle device according to the present invention, convenience is improved in the dispatch operation and the vehicle boarding.

DESCRIPTION OF EMBODIMENTS

Hereinafter, embodiments of the invention will be described with reference to the accompanying drawings. A vehicle remote operating system and an in-vehicle device according to an embodiment of the invention are for a driver or the like to dispatch a vehicle from a parking place by a remote operation from a portable terminal in the situations in which it is difficult to open a door wide in a state in which a vehicle is parked in a narrow parking place, and thus ingress and egress on people who intends to board the vehicle is difficult. Further, a vehicle remote operating system and an in-vehicle device according to an embodiment of the invention are for a driver or the like to dispatch a vehicle from a parking place by a remote operation from a portable terminal when it is raining or there is a heavy load.

Figure 1:
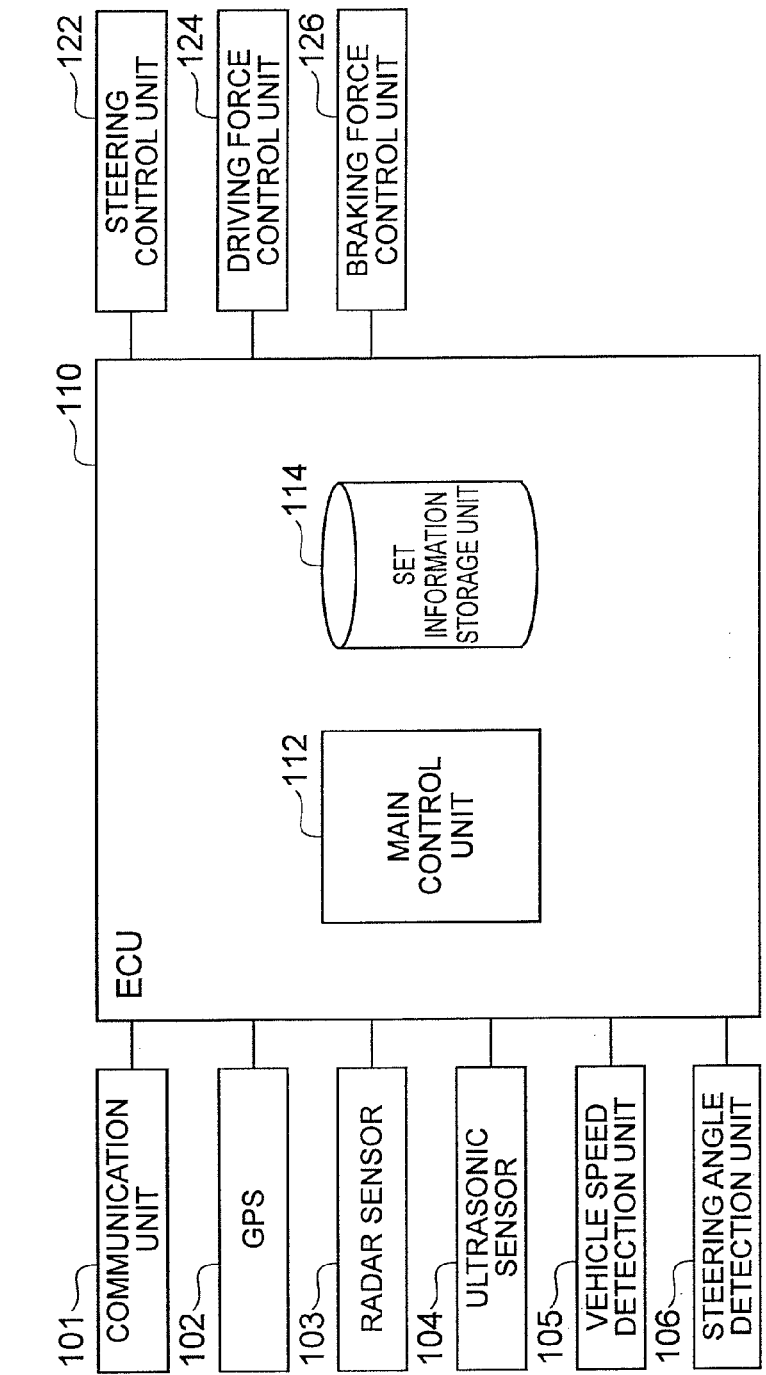
FIG. 1 is a block diagram illustrating the configuration of an in-vehicle device in a vehicle remote operating system related to an embodiment.

As illustrated in FIG. 1, the in-vehicle device 100 mounted on a vehicle in a vehicle remote operating system according to this embodiment includes a communication unit 101, a GPS 102, a radar sensor 103, an ultrasonic sensor 104, a vehicle speed detection unit 105, a steering angle detection unit 106, an ECU 110, a steering control unit 122, a driving force control unit 124, and a braking force control unit 126.

The communication unit 101 is a portion for transmitting/receiving a wireless signal with a portable terminal. Further, the communication unit 101 is a portion for acquiring information on surrounding road or traffic conditions through road-vehicle communication with roadside facilities such as optical beacons or inter-vehicle communication with other vehicles.

The GPS (Global Positioning System) 102 is a portion for measuring the position of the host vehicle. Further, the GPS 102 is also used to acquire information on the road shapes or facilities around the host vehicle from map information of a database and the position of the host vehicle.

The radar sensor 103 and the ultrasonic sensor 104 are sensors for detecting obstacles around the host vehicle. The radar sensor 103 and the ultrasonic sensor 104 are also used to acquire information on the road shapes around the host vehicle. The radar sensor 103 and the ultrasonic sensor 104 are also used to detect the position of a user who intends to board the host vehicle.

The vehicle speed detection unit 108 is a portion for detecting the speed of the vehicle from the rotational speed of the wheel. The steering detection unit 110 is a portion for detecting a steering angle of the vehicle.

The ECU (Electronic Control Unit) 110 has a main control unit 112 and setting information 114. The ECU is a portion for overall control of respective components of the in-vehicle device 100. The main control unit 112 performs parking and dispatch of a vehicle by a remote operation according to a specified parking program or dispatch program by a communication signal from the portable terminal. The setting information storage unit 114 stores information on the last parking position or the last dispatch position of the host vehicle. Further, the setting information storage unit 114 stores the information that the user has set for parking or dispatch.

The steering control unit 112 is a portion for changing a traveling direction of the vehicle through performing of steering according to a command signal from the main control unit 112 of the ECU 110, rather than through a steering operation input to a steering wheel. The driving force control unit 124 is a portion for changing the driving force of the vehicle through performing of opening and closing of a throttle valve according to the command signal from the main control unit 112, rather than through an acceleration operation input to an acceleration pedal. The braking force control unit 126 is a portion for changing the braking force of the vehicle through control of brake hydraulic pressure according to the command signal from the main control unit 112, rather than through a braking operation input to the braking pedal.

Figure 2:
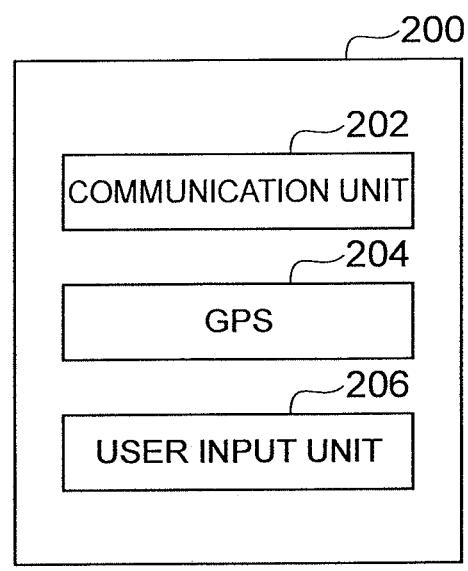
FIG. 2 is a block diagram illustrating the configuration of a portable terminal in a vehicle remote operating system related to an embodiment.

As illustrated in FIG. 2, a portable terminal 200, through which a user remotely operates the vehicle from outside of the vehicle, includes a communication unit 202, a GPS 204, and a user input unit 206.

The communication unit 202 is a portion for transmitting/receiving a wireless signal with the in-vehicle device 100. The GPS 204 is a portion for measuring the position of the user. The user input unit 206 is a portion for a user who remotely operates the vehicle to input information for the operation. The user input unit 206 is composed of operation keys or buttons for changing the setting information through making the in-vehicle device 100 execute a parking program and an dispatch program.

Figure 6:
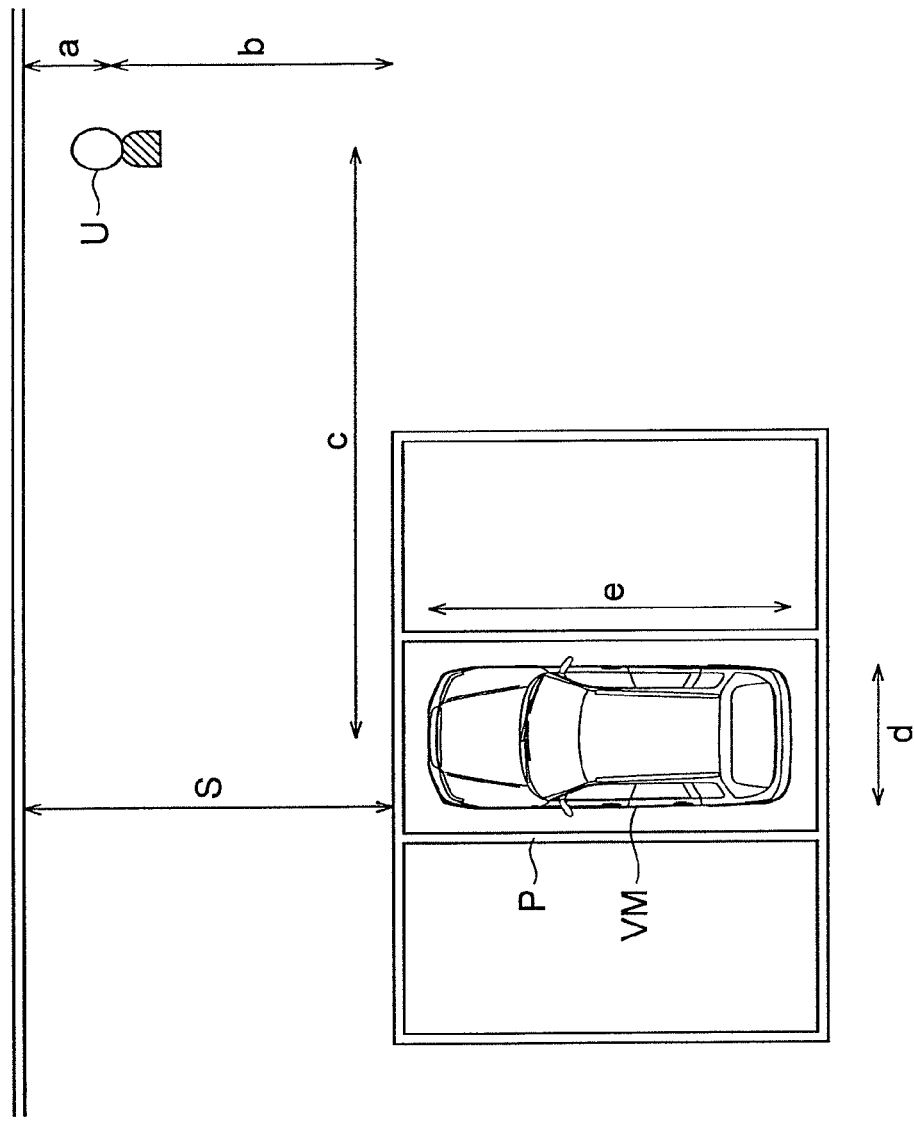
FIG. 6 is a plan view illustrating definitions of respective dimensions in parking positions.

In the following description, the operation of the vehicle remote operating system and the in-vehicle device will be described. The vehicle remote operating system according to this embodiment, as illustrated in FIG. 6, assumes a situation in which it is difficult to open a door wide in a state where the host vehicle VM is parked in a narrow parking place P, and thus it is difficult for the user U to board the host vehicle VM. The vehicle remote operating system according to this embodiment dispatches the host vehicle VM that is mounted on the in-vehicle device 100 from the portable terminal 200 up to the position of the user U according to a predetermined dispatch program executed by the remote operation of the user U who is outside the parking place P.

The vehicle remote operating system according to this embodiment can also be applied in the case where it is raining and thus the user U does not wish to move up to the parking position P. Further, the vehicle remote operating system according to this embodiment can also be applied in the case where the user has a heavy load and thus does not wish to move up to the parking position P. In this embodiment, it is not necessary for the user U who intends to board the host vehicle VM to operate the portable terminal 200, but any other person may operate the portable terminal 200.

In the following description, as illustrated in FIG. 6, dimensions of each part are defined. Such data may be acquired by the communication unit 101 or the GPS 102 or may be detected by the radar sensor 103 or the ultrasonic sensor 104 when the in-vehicle device executes the dispatch program. Further, such data may be detected by the radar sensor 103 or the ultrasonic sensor 104 of the in-vehicle device 100 when the host vehicle enters into the parking place P. Further, the user U may input data to the user input unit 206 of the portable terminal 200, and the communication unit 202 may transmit the corresponding data to the side of the in-vehicle device 100.

Further, in the following description, it is assumed that the host vehicle is parked with the front part thereof facing a road that extends in left and right directions, and the driver's seat of the host vehicle VM is positioned on the right side of the vehicle. A case where the host vehicle is parked with its front part facing the road or the driver's seat of the host vehicle VM is positioned on the left side of the vehicle is reverse to the case to be described hereinafter.

If the user U operates the user input unit 206 of the portable terminal 200, the communication unit 202 transmits the command signal to the in-vehicle device 100 to execute the dispatch program. According to the dispatch program executed hereinafter, it is assumed that the reachable dispatch position is set without switching between forward and reverse of the host vehicle VM from the parking place P. Once the user U starts the host vehicle VM by operating the user input unit 206 of the portable terminal 200, the in-vehicle device 100 makes the host vehicle VM automatically travel up to the dispatch position without the necessity of operating the portable terminal 200.

Figure 3:
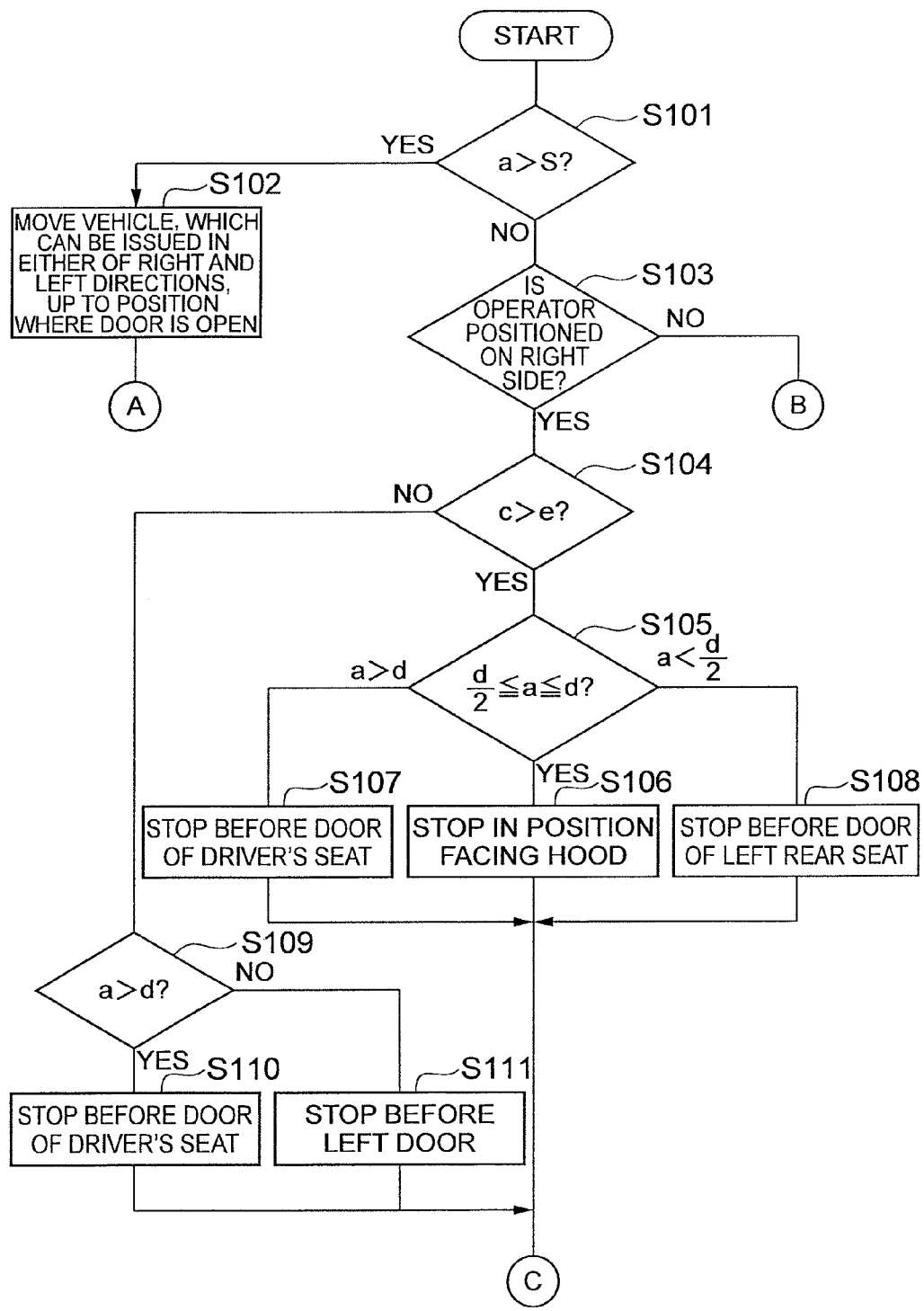
FIG. 3 is a flowchart illustrating an operation of a vehicle remote operating system related to an embodiment mainly in the case where an operator is positioned on the right side of a vehicle.
Figure 4:
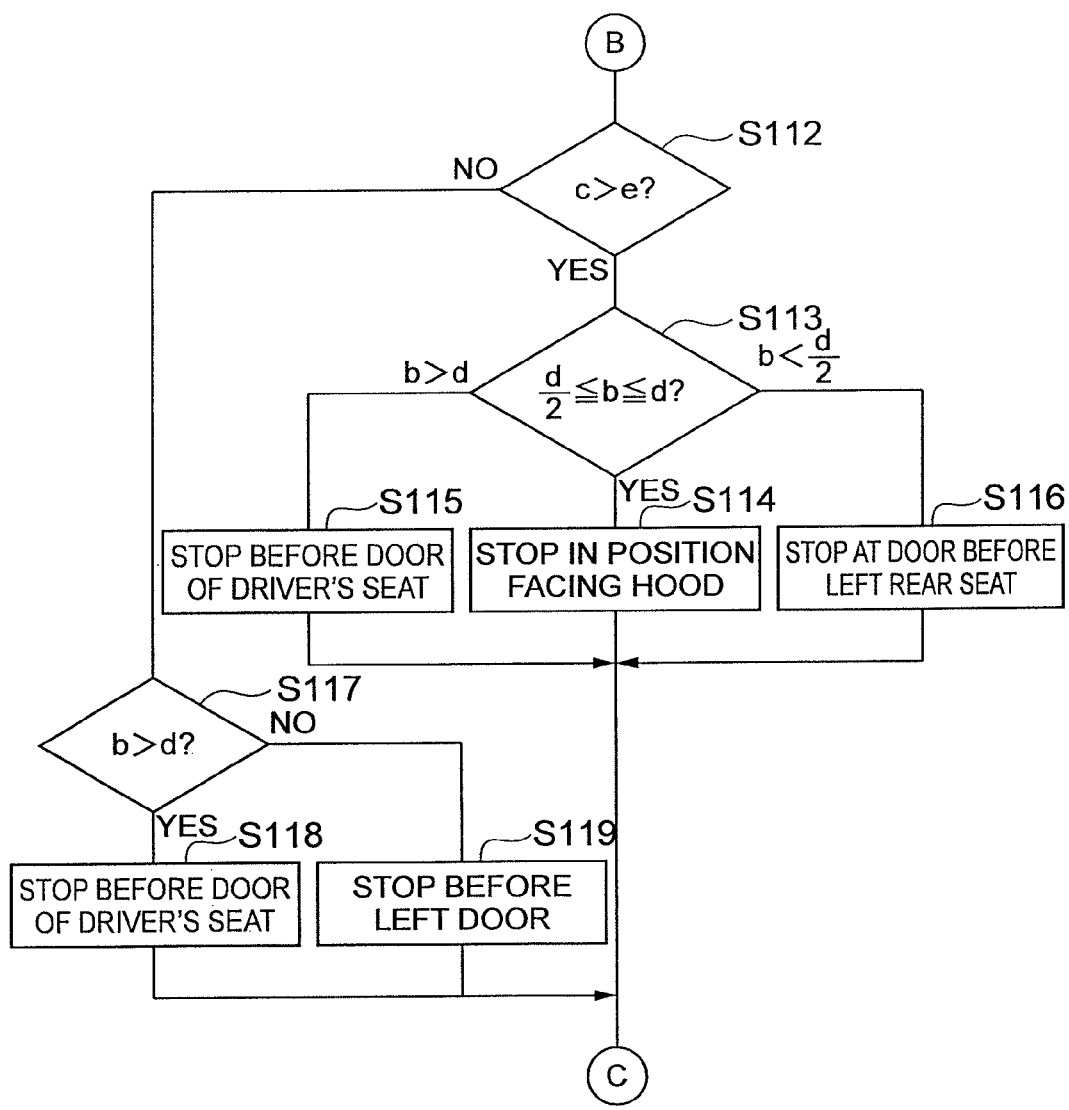
FIG. 4 is a flowchart illustrating an operation of a vehicle remote operating system related to an embodiment mainly in the case where an operator is positioned on the right side of a vehicle.
Figure 7:
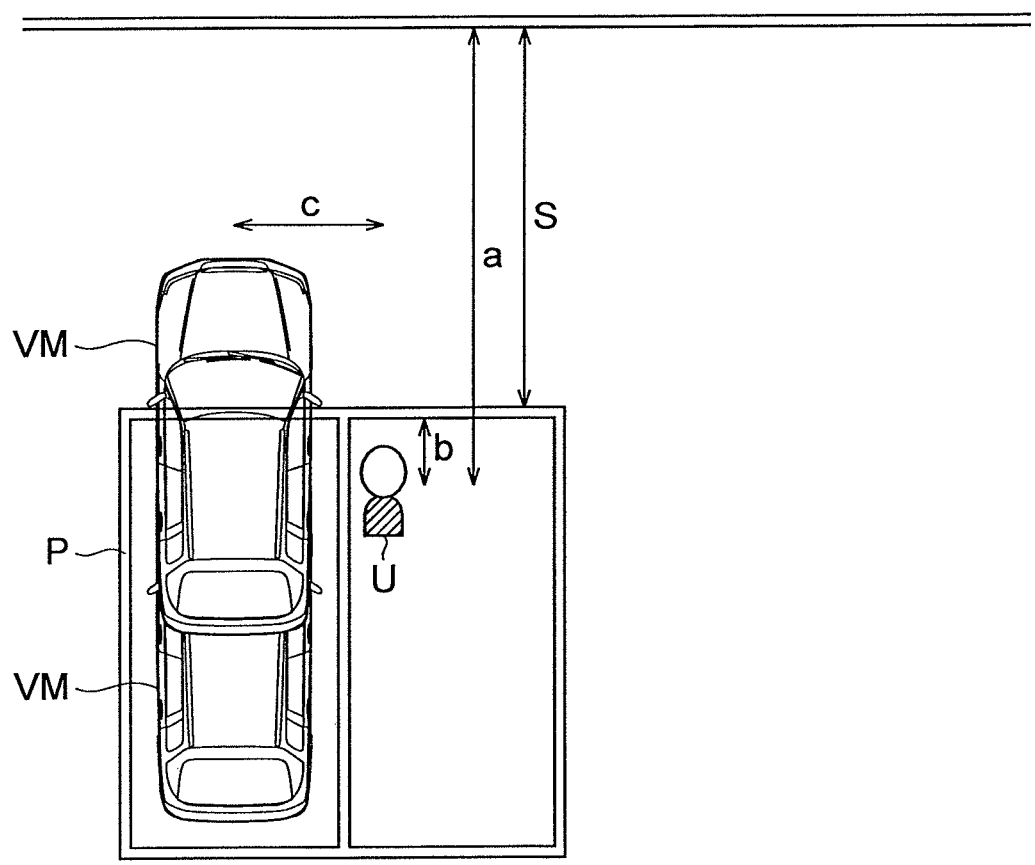
FIG. 7 is a plan view illustrating an operation during dispatch related to an embodiment, and particularly illustrating an operation in which a vehicle stops in a position in which a door is open.

If the dispatch program is executed, as illustrated in FIG. 3, the main control unit 112 of the in-vehicle device 100 compares a distance S between the host vehicle VM and a front obstacle that the host vehicle VM faces with a distance a between the user U and the corresponding obstacle (S101). In an example of FIG. 6, the obstacle may be wall surfaces or facilitates at both side ends of the road, and the distance S is the width of the road. If the distance a is larger than the distance S (S101), as illustrated in FIG. 7, the main control unit 112 moves the host vehicle VM up to a position in which the door is opened and thus the host vehicle VM can be dispatched to either of the right and left sides (S102).

The main control unit 112 determines whether or not the user U is positioned on the right side of the host vehicle VM (S103). If the user U is positioned on the right (S103), the main control unit 112 compares a distance c between the user U and the host vehicle VM that is parked with the entire length e of the host vehicle VM (S104). If c>e is satisfied (S104), that is, if the user U is far away and thus the host vehicle VM comes out from the parking position P and the vehicle body can be turned parallel to the road, the main control unit 112 compares the distance a between the front obstacle that the host vehicle VM faces during parking and the user U with the overall width d of the host vehicle VM (S105).

Figure 8:
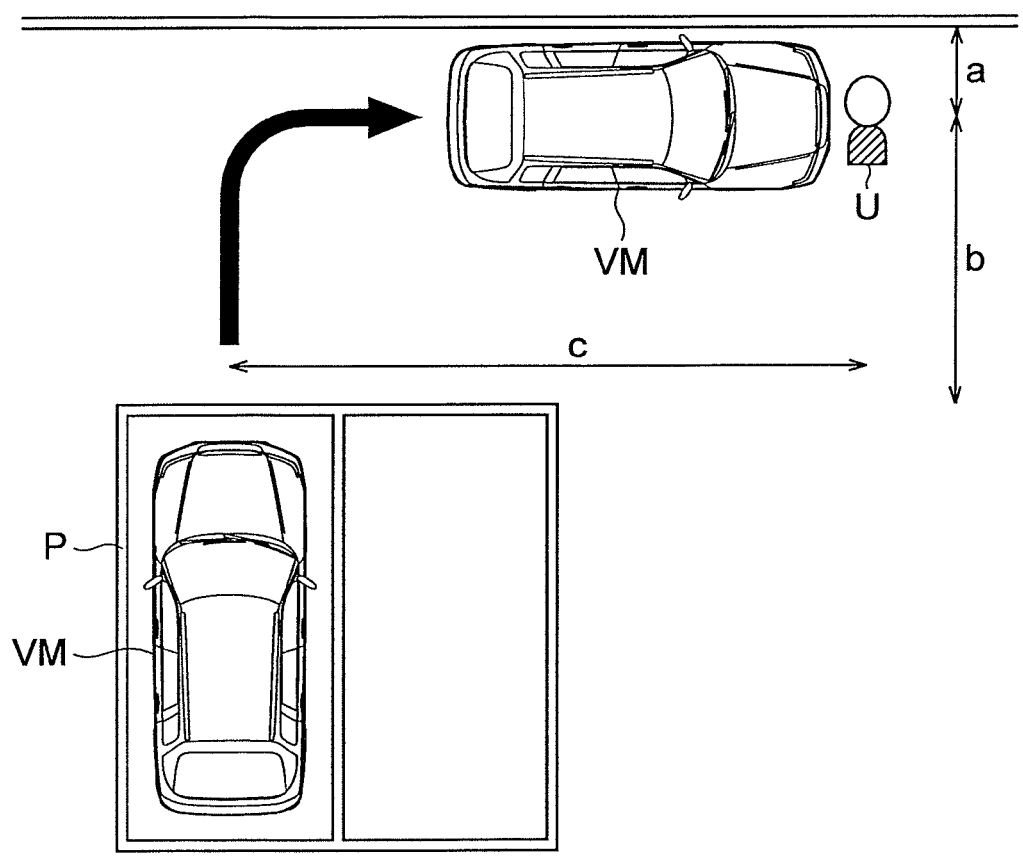
FIG. 8 is a plan view illustrating an operation during dispatch related to an embodiment, and particularly illustrating an operation in which a vehicle stops in a position in which an operator faces a hood of a vehicle.
Figure 9:
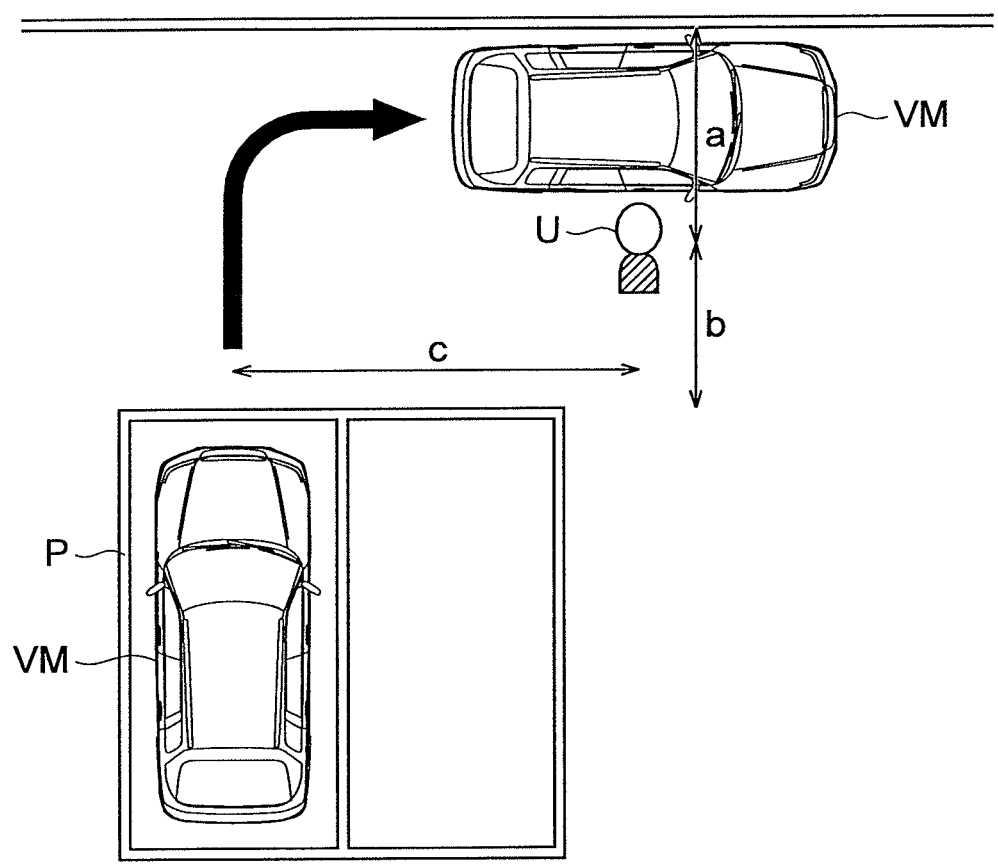
FIG. 9 is a plan view illustrating an operation during dispatch related to an embodiment, and particularly illustrating an operation in which a vehicle stops in a position in which an operator faces a driver's seat of a vehicle.
Figure 10:
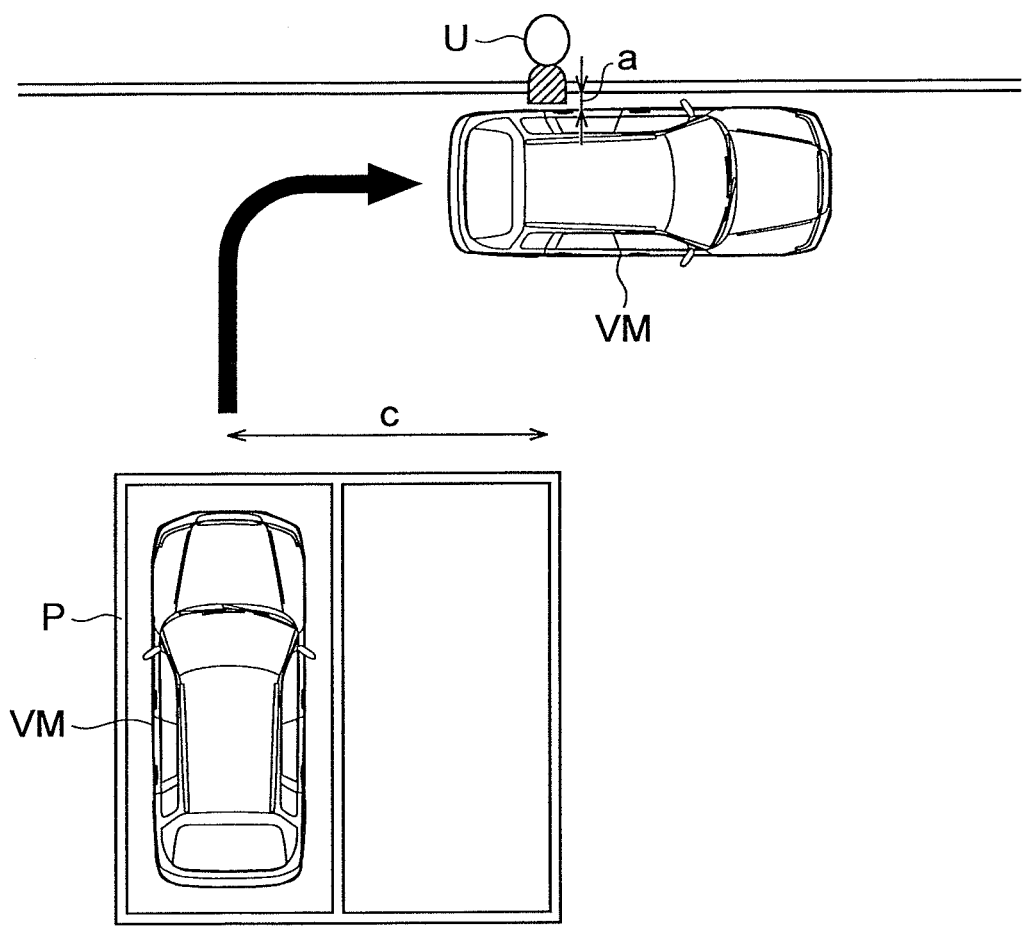
FIG. 10 is a plan view illustrating an operation during dispatch related to an embodiment, and particularly illustrating an operation in which a vehicle stops in a position in which an operator faces a left rear seat of a vehicle.

If d/2≤a≤d is satisfied (S105), as illustrated in FIG. 8, the main control unit 112 moves the host vehicle VM up to a position in which the user U faces the hood (S106). If a>d is satisfied (S105), that is if the distance a between the user U and the neighboring obstacle is larger than the overall width d of the host vehicle VM, as illustrated in FIG. 9, the main control unit 112 moves the host vehicle VM up to a position in which the user U faces the driver's seat (S107). If a<d/2 is satisfied (S105), as illustrated in FIG. 10, the main control unit 112 moves the host vehicle VM up to a position in which the user U faces the left rear seat (S109).

Figure 11:
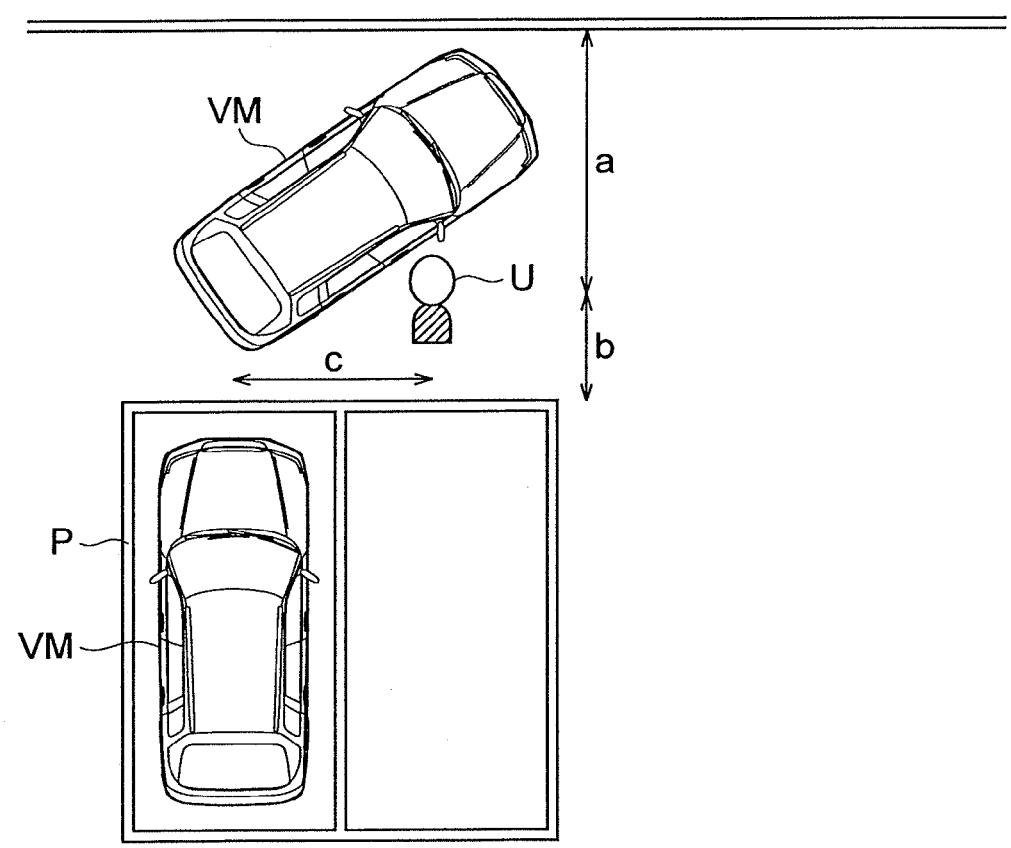
FIG. 11 is a plan view illustrating an operation during dispatch related to an embodiment, and particularly illustrating an operation in which a vehicle stops in a position in which an operator faces a driver's seat of a vehicle.
Figure 12:
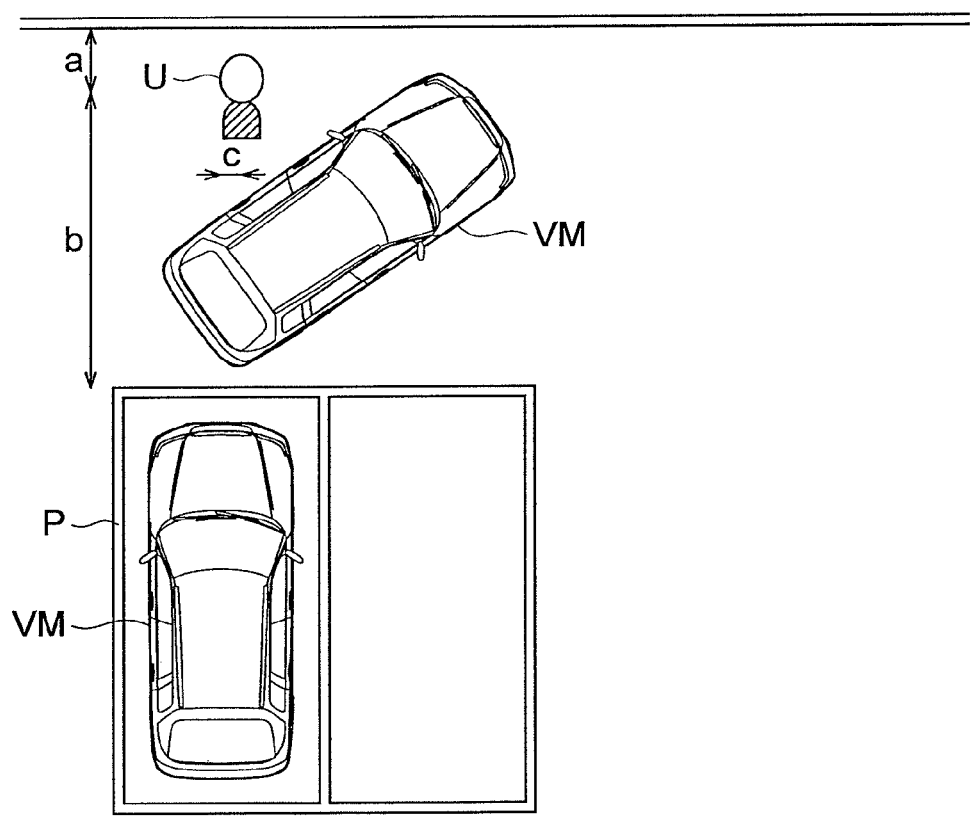
FIG. 12 is a plan view illustrating an operation during dispatch related to an embodiment, and particularly illustrating an operation in which a vehicle stops in a position in which an operator faces a left seat of a vehicle.

If c>e is not satisfied in S104, that is, if the user U is too close and thus the body of the host vehicle VM that comes out from the parking position P is unable to be turned parallel to the road, the main control unit 112 compares whether or not the distance a between the user U and the neighboring obstacle is larger than the overall width d of the host vehicle VM (S109). If a>d is satisfied (S109), as illustrated in FIG. 11, the main control unit 112 moves the host vehicle VM up to a position in which the user U faces the driver's seat (S110). If a>d is not satisfied (S109), as illustrated in FIG. 12, the main control unit 112 moves the host vehicle VM up to a position in which the user U faces the left seat (S111).

If the user U is positioned on the left side in S103 and c>e is satisfied (S104), that is, if the user U is far away and thus the host vehicle VM comes out from the parking position P and the vehicle body can be turned parallel to the road, the main control unit 112 compares the distance b between the obstacle that is present on the side where the host vehicle VM is parked during parking and the user U with the overall width d of the host vehicle VM (S113).

Figure 13:
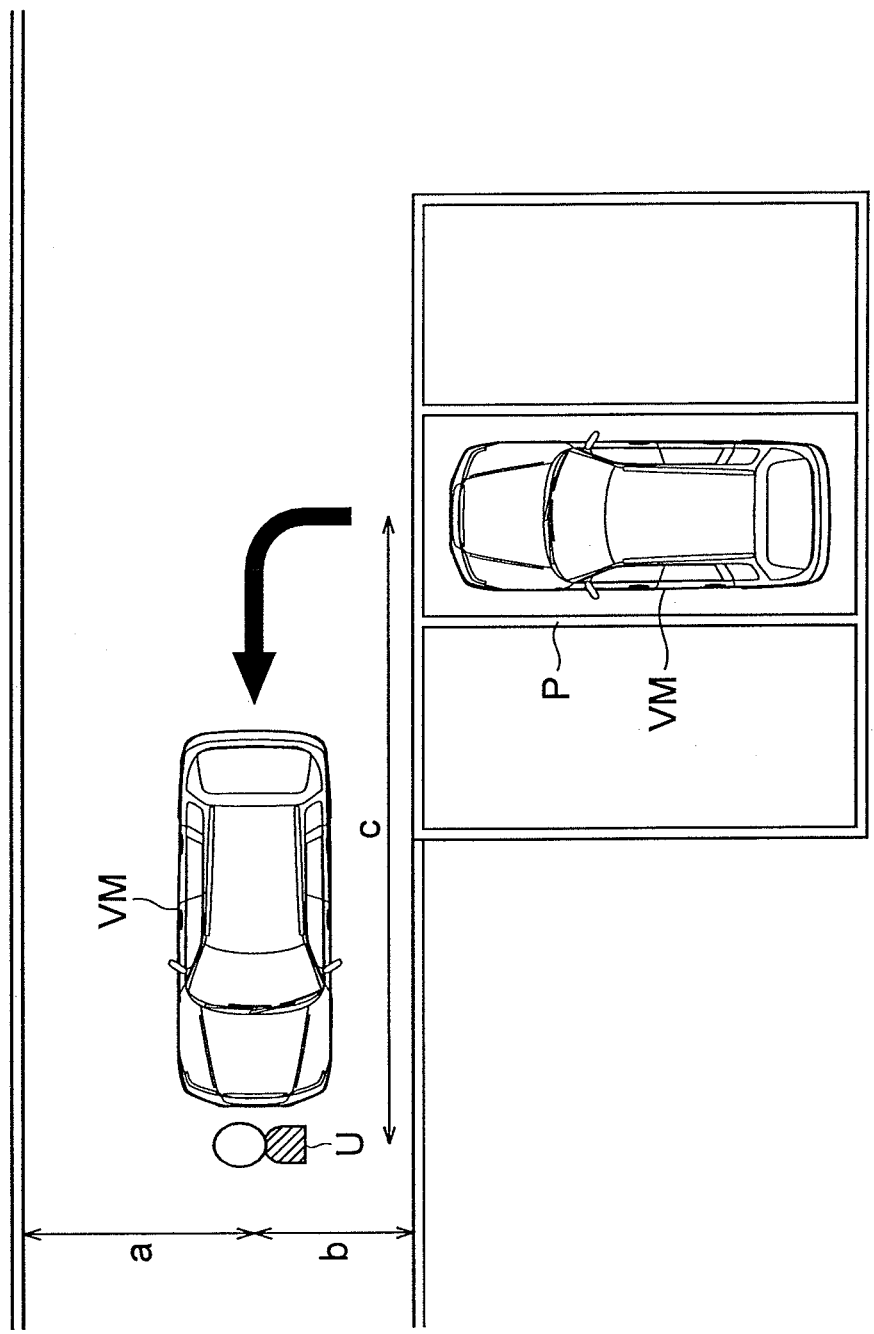
FIG. 13 is a plan view illustrating an operation during dispatch related to an embodiment, and particularly illustrating an operation in which a vehicle stops in a position in which an operator faces a hood of a vehicle.
Figure 14:
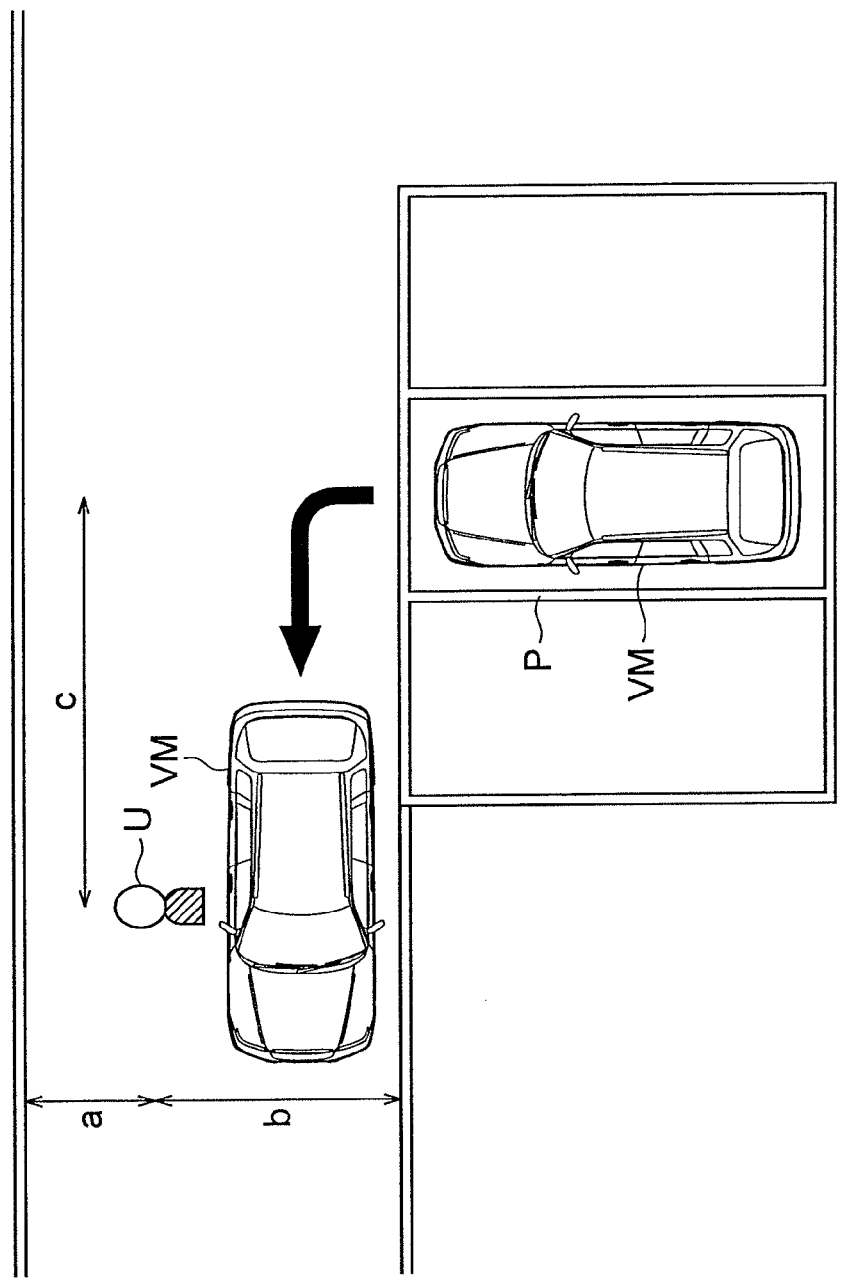
FIG. 14 is a plan view illustrating an operation during dispatch related to an embodiment, and particularly illustrating an operation in which a vehicle stops in a position in which an operator faces a driver's seat of a vehicle.
Figure 15:
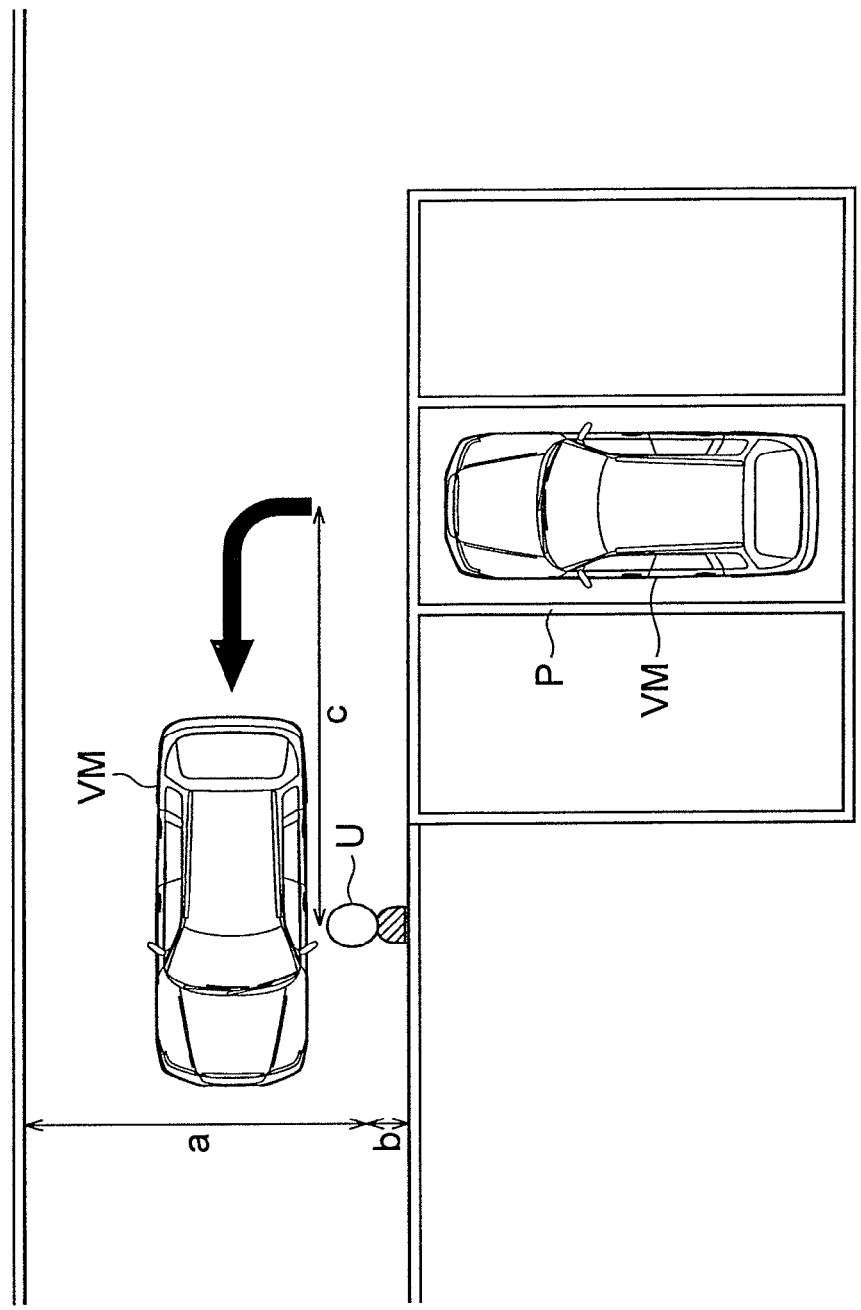
FIG. 15 is a plan view illustrating an operation during dispatch related to an embodiment, and particularly illustrating an operation in which a vehicle stops in a position in which an operator faces a left rear seat of a vehicle.

If d/2≤b≤d is satisfied (S113), as illustrated in FIG. 13, the main control unit 112 moves the host vehicle VM up to a position in which the user U faces the hood (S114). If b>d is satisfied (S113), that is if the distance b between the user U and the neighboring obstacle is larger than the overall width d of the host vehicle VM, as illustrated in FIG. 14, the main control unit 112 moves the host vehicle VM up to a position in which the user U faces the driver's seat (S115). If b<d/2 is satisfied (S113), as illustrated in FIG. 15, the main control unit 112 moves the host vehicle VM up to a position in which the user U faces the left rear seat (S116).

Figure 16:
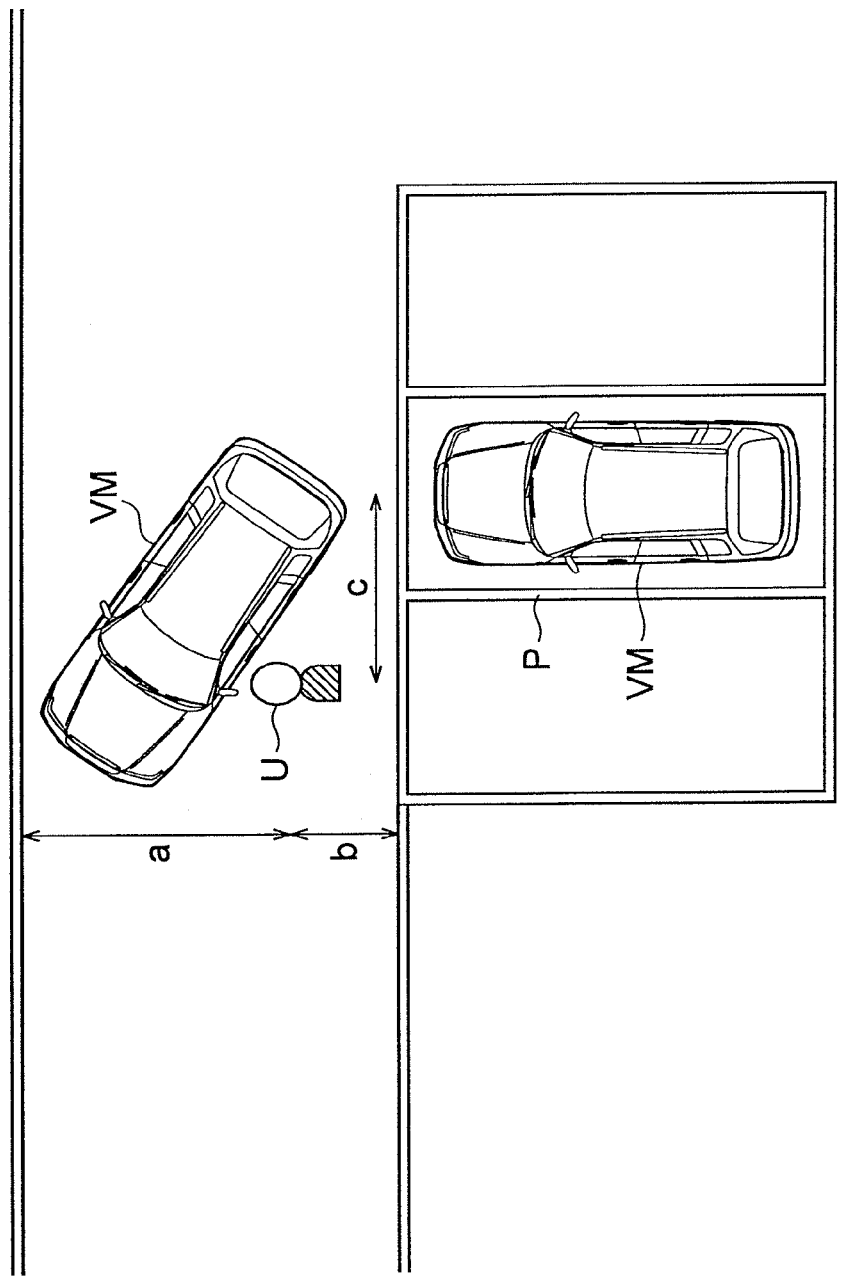
FIG. 16 is a plan view illustrating an operation during dispatch related to an embodiment, and particularly illustrating an operation in which a vehicle stops in a position in which an operator faces a left seat of a vehicle.
Figure 17:
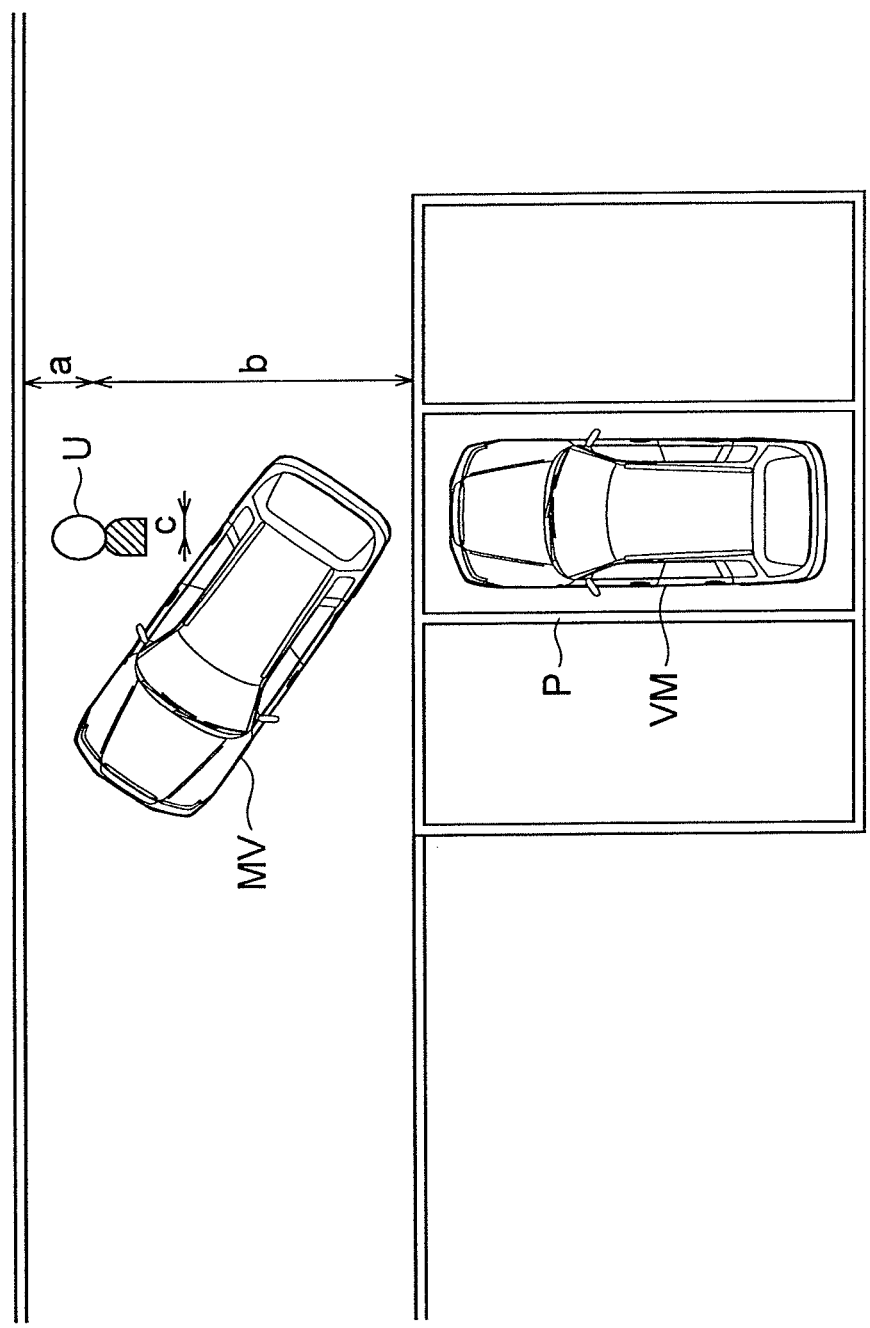
FIG. 17 is a plan view illustrating an operation during dispatch related to an embodiment, and particularly illustrating an operation in which a vehicle stops in a position in which an operator faces a driver's seat of a vehicle.

If c>e is not satisfied in S112, that is, if the user U is too close and thus the body of the host vehicle VM that comes out from the parking position P is unable to be turned parallel to the road, the main control unit 112 compares whether or not the distance b between the user U and the neighboring obstacle is larger than the overall width d of the host vehicle VM (S117). If b>d is satisfied (S117), as illustrated in FIG. 17, the main control unit 112 moves the host vehicle VM up to a position in which the user U faces the driver's seat (S118). If b>d is not satisfied (S117), as illustrated in FIG. 16, the main control unit 112 moves the host vehicle VM up to a position in which the user U faces the left seat (S119).

Figure 5:
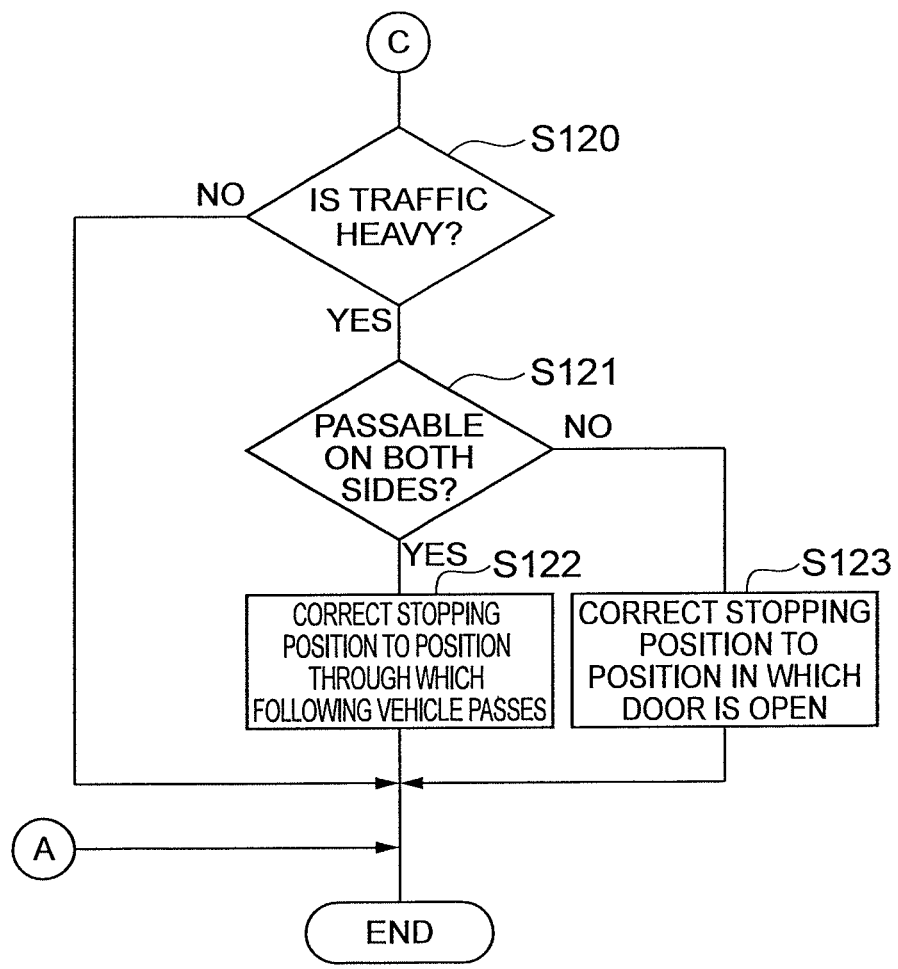
FIG. 5 is a flowchart illustrating an operation of a vehicle remote operating system related to an embodiment mainly in the case where traffic is heavy.
Figure 18:
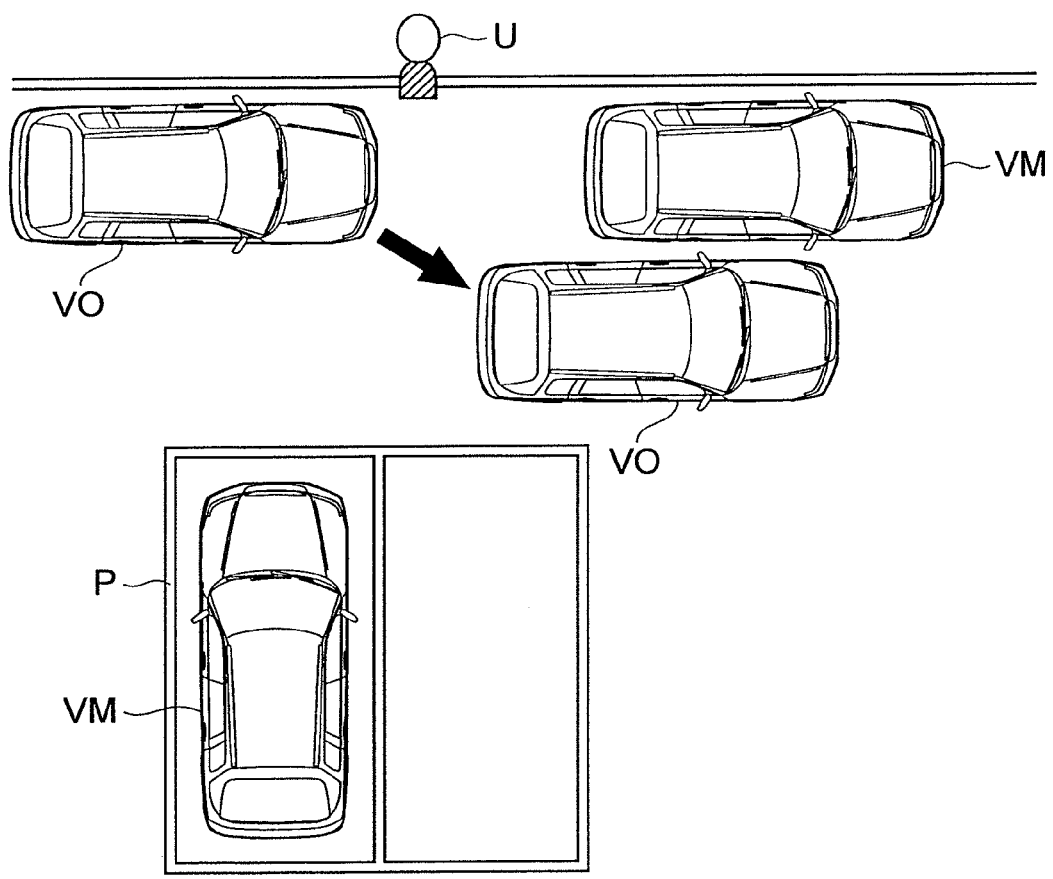
FIG. 18 is a plan view illustrating an operation during dispatch related to an embodiment, and particularly illustrating an operation in the case where traffic of a road is heavy and the road has a width which is passable on both sides.
Figure 19:
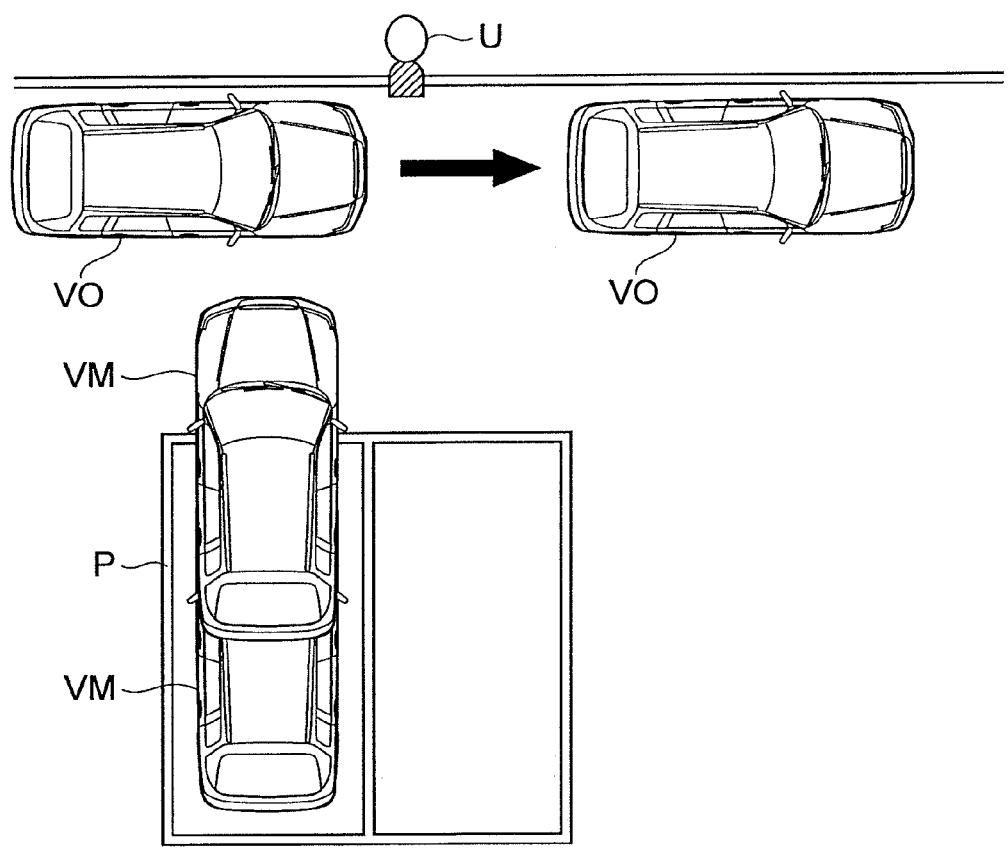
FIG. 19 is a plan view illustrating an operation during dispatch related to an embodiment, and particularly illustrating an operation in the case where traffic of a road is heavy and the road has a width which is not passable on both sides.

As illustrated in FIG. 5, the main control unit 112 determines traffic around the user U on the basis of information that can be obtained from the communication unit 101 and the GPS 102 or information on an object that is detected by the radar sensor 103 and the ultrasonic sensor 104 (S120). If the traffic around the user U is greater than a predetermined threshold value (S120), the main control unit 112 determines whether the road around the user U is passable on both sides (S121). If the road around the user U is passable on both sides (S121), as illustrated in FIG. 18, the main control unit 112 corrects the stopping position to a position in which another following vehicle VO can pass along the road (S122). If the road around the user U is not passable on both sides (S121), as illustrated in FIG. 19, the main control unit 112 corrects the stopping position to a position in which the door of the host vehicle VM is open (S122). In the above-described processes, if an operation temporarily stops the host vehicle VM through the remote operation from the portable terminal 200, the main control unit 112 stops the host vehicle VM.

Figure 20:
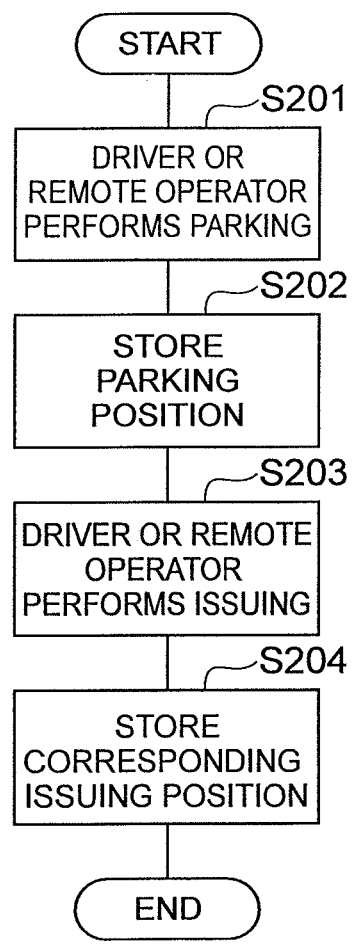
FIG. 20 is a flowchart illustrating an operation of a vehicle remote operating system related to an embodiment, and particularly illustrating a series of operations performed as parking and dispatch.

The vehicle remote operating system according to this embodiment as described above can be used as follows in a daily or frequently used parking place. As illustrated in FIG. 20, the user U who performs the remote operation through a driver or the portable terminal 200 parks the host vehicle VM in the parking place P as shown in FIG. 6 (S201). The main control unit 112 stores the corresponding parking position in the setting information storage unit 114 (S202). Next, the user U who performs the remote operation through the driver or the portable terminal 200 as described above dispatches the host vehicle VM (S203). The main control unit 112 stores the corresponding dispatch position in which the user is received in the setting information storage unit 114 (S204). By this, in a daily or frequently used parking place, the parking and the dispatch can be performed without repeating the operation such as setting of the dispatch position or the like.

Figure 21:
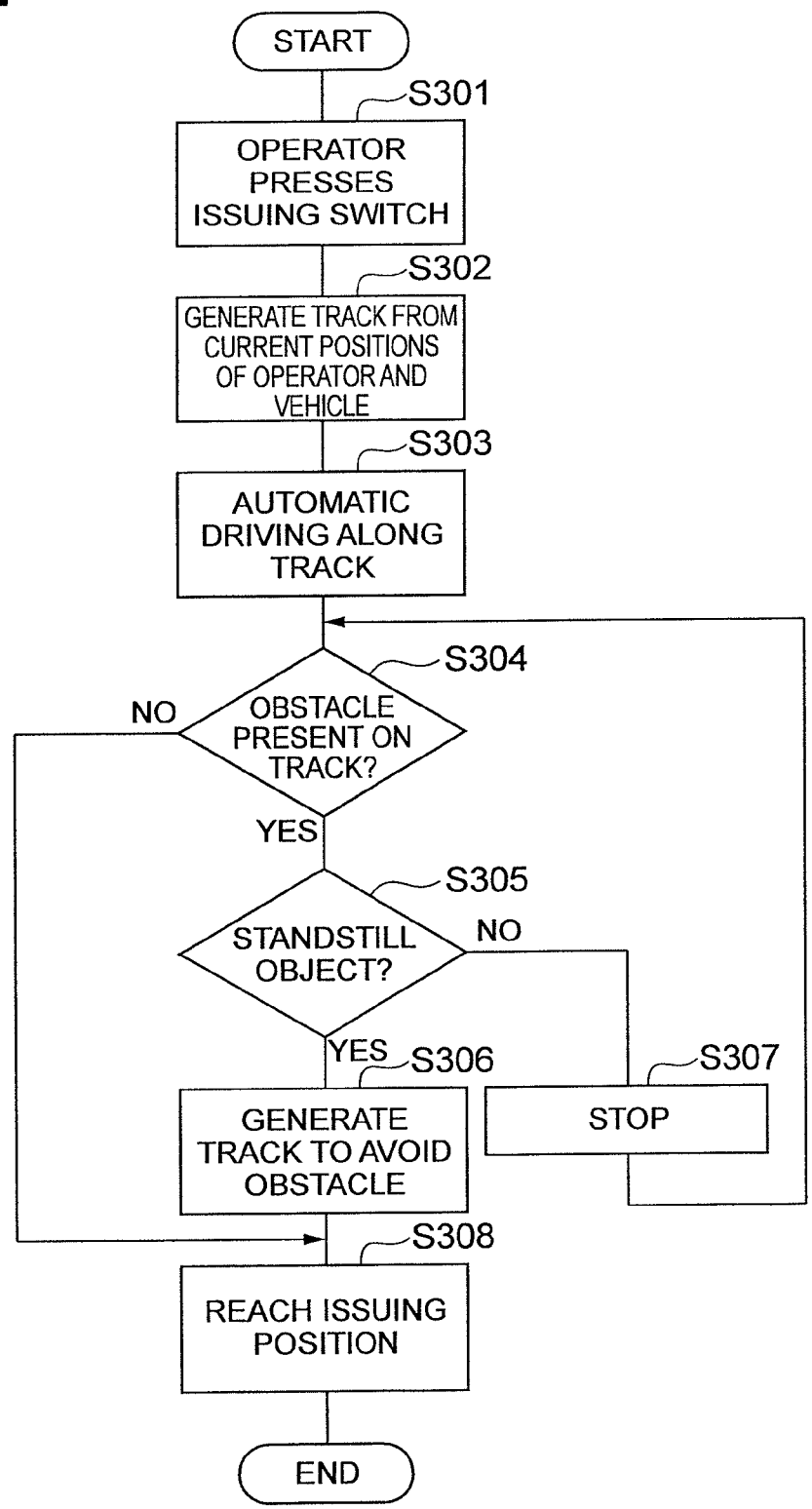
FIG. 21 is a flowchart illustrating an operation of a vehicle remote operating system related to an embodiment, and particularly illustrating an operation in the case where an obstacle is present.

Further, during the dispatch through the remote operation as described above, there is a possibility that an obstacle is present on a track where the host vehicle VM travels, and the following process is performed with respect to the obstacle. As illustrated in FIG. 21, the user operates an dispatch switch or the like of the user input unit 206 of the portable terminal 200 (S301). The main control unit 112 of the in-vehicle device 100 sets the dispatch position as described above from the current position of the user U and the host vehicle VM, and generates a track along which the host vehicle VM is made to travel (S302). The main control unit 112 automatically drives the host vehicle VM along the generated track without the necessity of the operation to the portable terminal 200 or the host vehicle VM (S303).

The laser sensor 103 or the ultrasonic sensor 104 detects an obstacle on the track (S304), and if the obstacle is at a standstill (S305), the main control unit 112 reconfigures a track which avoids the obstacle and is reachable to the dispatch position (S306). If the obstacle is not at a standstill (S305), the main control unit 112 stops the host vehicle VM until no obstacle is present on the track (S307 and S304). The above-described operation is performed until the host vehicle VM reaches the dispatch position (S308). As in the first embodiment, if an operation of temporarily stopping the host vehicle VM is performed through the remote operation from the portable terminal 200, the main control unit 112 can stop the host vehicle VM.

According to this embodiment, in the vehicle remote operating system that remotely operates the host vehicle VM from the portable terminal 200, the main control unit 112 of the ECU 110 of the in-vehicle device 100 determines the dispatch position of the host vehicle VM on the basis of the parking position of the host vehicle VM and the position of the user who intends to board the host vehicle VM. Due to this, it is possible to dispatch the host vehicle VM according to the parking position of the host vehicle VM and the position of the user U, and thus the convenience is improved in the dispatch operation and the boarding of the host vehicle VM.

Further, the main control unit 112 determines the dispatch position of the host vehicle VM on the basis of the obstacle that is present around the user U. Due to this, it is possible to dispatch the host vehicle VM according to the obstacle that is present around the user U in addition to the parking position of the host vehicle VM and the position of the user U, and thus the convenience is improved in the dispatch operation and the boarding of the host vehicle VM.

Further, the main control unit 112 determines the dispatch position of the host vehicle VM on the basis of a distance S that is the width of the road around the user U. Due to this, it is possible to dispatch the host vehicle VM according to the width of the road around the user U in addition to the parking position of the host vehicle VM and the position of the user U, and thus convenience is improved in the dispatch operation and the boarding of the host vehicle VM.

Further, the main control unit 112 determines the position in which the host vehicle VM stops with a driver's seat of the host vehicle VM facing toward the user U as the dispatch position when the distance a or b between the obstacle that is present around the user U, such as the wall surface or facilities, and the user U is larger than the width d of the vehicle and the host vehicle VM can move to the position in which the host vehicle VM stops with a driver's seat of the host vehicle VM facing toward the user U without switching between forward and reverse of the vehicle from the parking position. Due to this, if circumstances permit, it is possible to dispatch the host vehicle VM to the position in which the host vehicle VM stops with a driver's seat of the host vehicle VM facing toward the user U, and thus the convenience is improved in the boarding of the host vehicle VM.

Further, the main control unit 112 determines any one of a position in which the host vehicle VM stops with any one seat except for a driver's seat of the host vehicle VM facing toward the user U and a position in which the host vehicle VM stops with a front end of the vehicle facing toward the user U as the dispatch position when the distance a or b between the obstacle that is present around the user U, such as the wall surface or facilities, and the user U is equal to or smaller than the width d of the host vehicle VM and the vehicle is unable to move to the position in which the host vehicle VM stops with a driver's seat of the host vehicle VM facing toward the user U without switching between forward and reverse of the vehicle from the parking position. Due to this, even in the circumstances in which it is not possible to dispatch the host vehicle VM to a position in which the host vehicle VM stops with a driver's seat of the host vehicle VM facing toward the user U, it is possible to dispatch the host vehicle VM to the position in which the user can easily board the host vehicle VM, and thus the convenience is further improved in the boarding of the host vehicle VM.

Further, the main control unit 112 determines the dispatch position of the host vehicle VM on the basis of the traffic of the road in the surroundings of the user U. Due to this, it is possible to dispatch the host vehicle VM according to the traffic of the road in the surroundings of the passenger, in addition to the parking position of the host vehicle VM and the position of the user U, and thus harmony with the surrounding road traffic can be achieved.

Further, the main control unit 112 determines the position in which another vehicle VO can pass along the road around the user U as the dispatch position if the traffic of the road around the user U is equal to or greater than the specified threshold value. Due to this, it is possible to dispatch the host vehicle VM to the position in which passing of another vehicle VO is not disturbed even when the traffic of the road around the user U is heavy, and thus harmony with the surrounding road traffic can be achieved.

Further, according to this embodiment, the main control unit 112 moves the host vehicle VM up to the determined dispatch position, independently of the operation to the portable terminal 200, after the host vehicle VM starts from the parking position of the host vehicle VM. Due to this, the operation to the portable terminal 200 becomes unnecessary during movement of the host vehicle VM, and the dispatch operation becomes easier.

In addition, according to this embodiment, the main control unit 112 temporarily stop the host vehicle VM that is moving through the operation from the portable terminal 200. Due to this, for safety, it becomes possible to temporarily stop the parking support or the host vehicle VM through the operation from the portable terminal 200.

Although embodiments of the invention have been described, the present invention is not limited to the above-described embodiments, and is executed in various ways.

INDUSTRIAL APPLICABILITY

According to the vehicle remote operating system and the in-vehicle device according to the invention, convenience is improved in the dispatch operation and the vehicle boarding.

REFERENCE SIGNS LIST

100: in-vehicle device
101: communication unit
102: GPS
103: radar sensor
104: ultrasonic sensor
105: vehicle speed detection unit
106: steering angle detection unit
110: ECU
112: main control unit
114: setting information storage unit
122: steering control unit
124: driving force control unit
126: braking force control unit
200: portable terminal
202: communication unit
204: GPS
206: user input unit

The invention claimed is:

1. A vehicle remote operating system that remotely operates a vehicle from a communication terminal, comprising:
a dispatch position determination unit that determines a position in which the vehicle stops in an orientation with any one seat of the vehicle facing toward a passenger who intends to board the vehicle as a dispatch position,
wherein the dispatch position determination unit determines the position in which the vehicle stops in an orientation with any one seat of the vehicle facing toward the passenger as the dispatch position on the basis of a distance between an obstacle that is present in the surroundings of the passenger and the passenger,
wherein the dispatch position determination unit determines the dispatch position of the vehicle on the basis of traffic of a road in the surroundings of the passenger, and
wherein the dispatch position determination unit determines a position in which another vehicle can pass along the road in the surroundings of the passenger as the dispatch position responsive to traffic of the road in the surroundings of the passenger being equal to or greater than a predetermined threshold value.

2. The vehicle remote operating system according to claim 1, wherein the dispatch position determination unit determines the dispatch position of the vehicle on the basis of a width of a road in the surroundings of the passenger.

3. The vehicle remote operating system according to claim 1, wherein the dispatch position determination unit determines the position in which the vehicle stops in an orientation with any one seat of the vehicle facing toward the passenger as the dispatch position when a distance between the obstacle that is present in the surroundings of the passenger and the passenger is equal to or smaller than the width of the vehicle or when the vehicle is unable to move to the position in which the vehicle stops with a driver's seat of the vehicle facing toward the passenger without switching between forward and reverse of the vehicle from the parking position.

4. The vehicle remote operating system according to claim 1, further comprising an automatic dispatch unit moving the vehicle up to the dispatch position of the vehicle that is determined by the dispatch position determination unit, independently of an operation to the communication terminal, after the vehicle starts from the parking position of the vehicle.

5. The vehicle remote operating system according to claim 1, further comprising a temporary stop unit temporarily stopping the moving vehicle by a remote operation from the communication terminal.

6. An in-vehicle device mounted on a vehicle in a vehicle remote operating system that remotely operates the vehicle from a communication terminal, comprising:
- a dispatch position determination unit that determines a position in which the vehicle stops in an orientation with any one seat of the vehicle facing toward a passenger who intends to board the vehicle as a dispatch position,
- wherein the dispatch position determination unit determines the position in which the vehicle stops in an orientation with any one seat of the vehicle facing toward the passenger as the dispatch position on the basis of a distance between an obstacle that is present in the surroundings of the passenger and the passenger,
- wherein the dispatch position determination unit determines the dispatch position of the vehicle on the basis of traffic of a road in the surroundings of the passenger, and
- wherein the dispatch position determination unit determines a position in which another vehicle can pass along the road in the surroundings of the passenger as the dispatch position responsive to traffic of the road in the surroundings of the passenger being equal to or greater than a specified threshold value.

7. The in-vehicle device according to claim 6, wherein the dispatch position determination unit determines the dispatch position of the vehicle on the basis of a width of a road in the surroundings of the passenger.

8. The in-vehicle device according to claim 6, wherein the dispatch position determination unit determines the position in which the vehicle stops in an orientation with any one seat of the vehicle facing toward the passenger as the dispatch position when a distance between the obstacle that is present in the surroundings of the passenger and the passenger is equal to or smaller than the width of the vehicle or when the vehicle is unable to move to the position in which the vehicle stops with a driver's seat of the vehicle facing toward the passenger without switching between forward and reverse of the vehicle from the parking position.

9. The in-vehicle device according to claim 6, further comprising an automatic dispatch unit moving the vehicle up to the dispatch position of the vehicle that is determined by the dispatch position determination unit, independently of an operation to the communication terminal, after the vehicle starts from the parking position of the vehicle.

10. The in-vehicle device according to claim 6, further comprising a temporary stop unit temporarily stopping the moving vehicle by a remote operation from the communication terminal.

* * * * *